(12) United States Patent
Mickelsen et al.

(10) Patent No.: US 9,961,408 B2
(45) Date of Patent: May 1, 2018

(54) APPARATUS, SYSTEMS AND METHODS FOR VIDEO OUTPUT BRIGHTNESS ADJUSTMENT

(71) Applicant: EchoStar Technologies L.L.C., Englewood, CO (US)

(72) Inventors: Jeremy Mickelsen, Denver, CO (US); Adam Schafer, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 333 days.

(21) Appl. No.: 14/573,929

(22) Filed: Dec. 17, 2014

(65) Prior Publication Data

US 2016/0180809 A1 Jun. 23, 2016

(51) Int. Cl.
  *G06F 3/023* (2006.01)
  *H04N 21/485* (2011.01)
  *H04N 21/422* (2011.01)
  *G09G 5/00* (2006.01)
  *G09G 5/02* (2006.01)

(52) U.S. Cl.
  CPC .......... *H04N 21/4854* (2013.01); *G09G 5/00* (2013.01); *G09G 5/026* (2013.01); *H04N 21/42221* (2013.01); *G09G 2320/0673* (2013.01); *G09G 2320/08* (2013.01); *G09G 2340/06* (2013.01)

(58) Field of Classification Search
  None
  See application file for complete search history.

(56) References Cited

U.S. PATENT DOCUMENTS

| 5,448,288 A * | 9/1995 | Oue ....................... H04N 17/04 348/184 |
| 5,661,575 A * | 8/1997 | Yamashita ............... H04N 9/69 348/674 |
| 7,271,705 B2 * | 9/2007 | Chon .................... G04G 13/023 340/309.16 |
| 7,667,781 B2 * | 2/2010 | Yamamoto ........... H04N 5/4403 348/553 |
| 2005/0024538 A1 * | 2/2005 | Park ........................ G09G 5/10 348/602 |
| 2005/0225983 A1 * | 10/2005 | Fornell .................... H04M 1/22 362/276 |
| 2008/0238935 A1 * | 10/2008 | Huang .................... G06T 5/009 345/617 |
| 2009/0202165 A1 * | 8/2009 | Tabata ................... H04N 19/60 382/248 |
| 2011/0082615 A1 * | 4/2011 | Small ..................... B60K 35/00 715/765 |
| 2016/0156873 A1 * | 6/2016 | Toye ....................... H04N 5/63 348/453 |

OTHER PUBLICATIONS

Brian Agnew, Sharing a variable between multiple different threads, Nov. 27, 2012, p. 1-3.*

* cited by examiner

*Primary Examiner* — Jeffrey A Gaffin
*Assistant Examiner* — Nhat-Huy T Nguyen
(74) *Attorney, Agent, or Firm* — Lowe Graham Jones PLLC (57) ABSTRACT

Systems and methods are operable to increase brightness output from a display. An exemplary embodiment detects a predefined user action of a remote control, and then increases brightness of a currently presented image that is being presented on the display in response to detecting the predefined user action so that an ambient lighting level in the vicinity of the display is increased.

22 Claims, 3 Drawing Sheets

APPARATUS, SYSTEMS AND METHODS FOR VIDEO OUTPUT BRIGHTNESS ADJUSTMENT

BACKGROUND

Media devices, such as a set top box (STB), a television (TV), a computer system, a game system, or the like, are often configured to present video content on a display. The display may be an integral component of the media device, such as in the case of a TV, or may be another device coupled to the media device, such as a STB that controls a TV.

These media devices and the associated displays are typically used in an indoors environment, such as at a residence or other suitable customer premises. The media device and the associated display may be located in any suitable interior space, such as a living room, media room, family room, bedroom, den, kitchen, bathroom, office, or the like. Such interior spaces are referred to interchangeably herein as a media room.

At times, the media room where the media device and the associated display are located may become relatively dark. For example, the media room may have one or more windows to the outside environment. After sunset, when no ambient outdoor light is entering through the windows, and if no interior lights are providing interior light, the media room may become relatively dark. As another non-limited example, the media room may be a dedicated space specially designed for presentation of media content, and thus have no windows and/or may have light blocking curtains if windows are present.

When media content is being presented to one or more users in the media room at times when the ambient lighting level is relatively low, the users may have difficulty performing various tasks because of poor visibility resulting from the lack of ambient light. For example, the user may have difficulty viewing the controllers (buttons, etc.) on the remote control that control operation of the media device and/or the associated display. As another example, the user may have difficulty grasping an object, such as a glass containing a favorite beverage. Further, in the event that the user needs to move about the media room or perform some particular task within the media room, the user may have difficulty seeing obstructions as they move about the media room.

Accordingly, there is a need in the arts to, at times, provide an increase to the relatively low ambient lighting level in the media room.

SUMMARY

Systems and methods of increasing brightness output from a display are disclosed. An exemplary embodiment detects a predefined user action of a remote control, and then increases brightness of a currently presented image that is being presented on the display in response to detecting the predefined user action so that an ambient lighting level in the vicinity of the display is increased.

BRIEF DESCRIPTION OF THE DRAWINGS

Preferred and alternative embodiments are described in detail below with reference to the following drawings.

DETAILED DESCRIPTION

Figure 1:
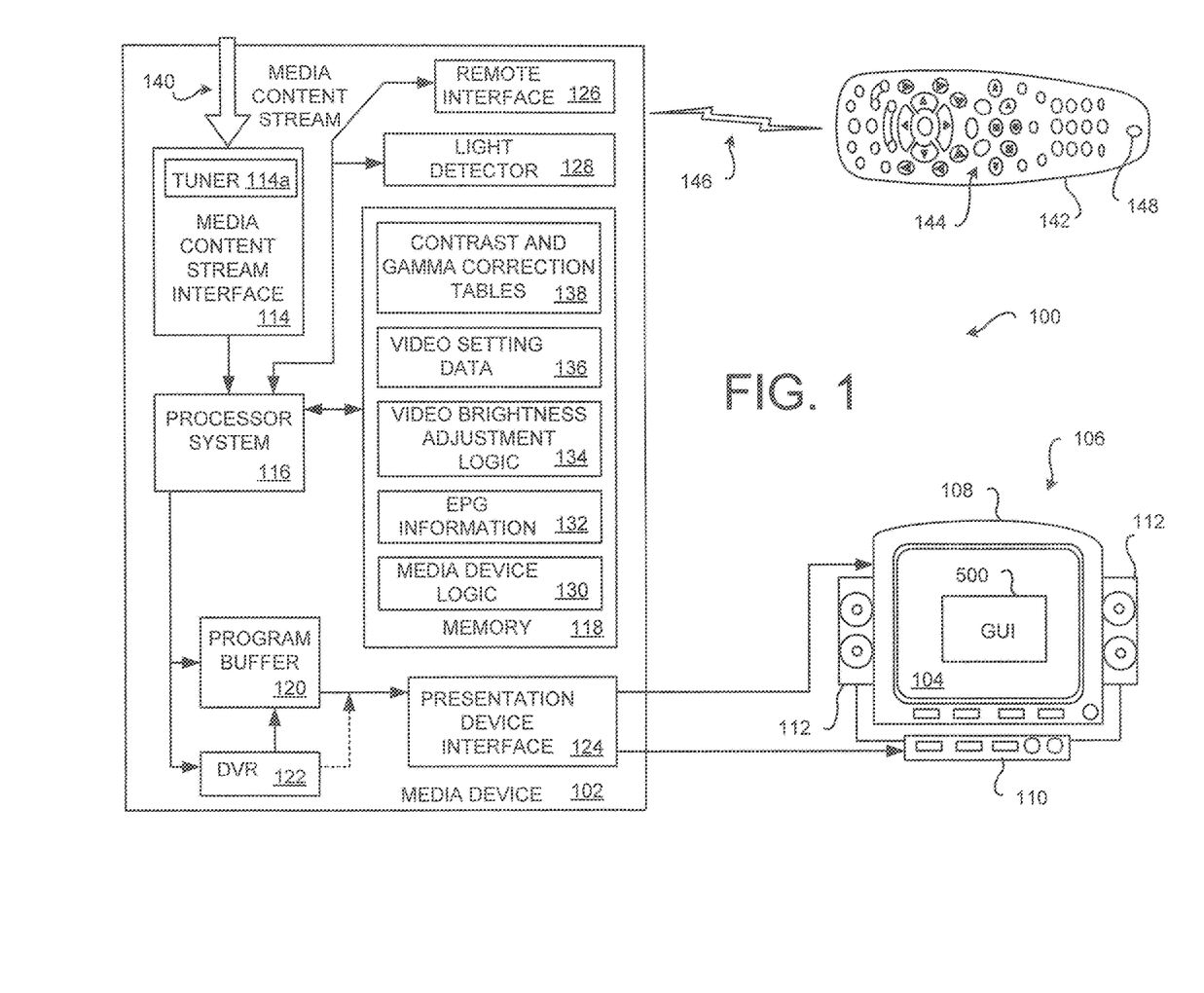
FIG. 1 is a block diagram of an embodiment of a video output brightness adjustment system implemented in a media device.

FIG. 1 is a block diagram of an embodiment of a video output brightness adjustment system 100 implemented in a media device 102, such as, but not limited to, a set top box (STB). Embodiments of the video output brightness adjustment system 100 may be implemented in other media devices, such as, but not limited to, a television (TV), a digital video disc (DVD) player, a digital video recorder (DVR), a game playing device, or a personal computer (PC) that is configured to receive present video content on a display 104. The display 104 may be an integral component of the media device 102, such as in the case of a TV, or may be a component of a media presentation system 106 that is communicatively coupled to the media device, such as a STB that controls a TV.

Embodiments of the video output brightness adjustment system 100 are configured to increase brightness output of a currently presented image (a still image or a video image) from the display 104 in response to a predefined user action. Accordingly, the otherwise relatively low ambient lighting level in a media room is increased by some amount of luminosity that is discernible to a user in the media room. The increased brightness in the media room assists the user in performing some task, such as operating a remote control, grasping an object, and/or moving about the media space.

Embodiments detect the predefined user action. In response to the user action, embodiments automatically adjust (increase) the brightness output by some predefined amount of increase in brightness, defined herein as a brightness increase value. Alternatively, or additionally, embodiments of the video output brightness adjustment system 100 may increase the brightness output based on a user specification.

Additionally, or alternatively, embodiments of the video output brightness adjustment system 100 may be further configured to adjust image contrast and/or adjust the amount of gamma correction. Adjustments to the image contrast and/or to the amount of gamma correction may be used to improve image quality and/or modify the level of the changed output brightness.

One skilled in the art appreciates that an increase to the image brightness may cause, at least for some portions of an image, an appearance of image "whitewashing" where that portion of the image is perceived as a substantially white, and very bright, region of the image. In such whitewashed regions, the image brightness data has been increased to, or has been increased nearly to, a maximum brightness value. When a portion of the image has become whitewashed, the user is no longer able to perceive features of the image in the whitewashed region. This effect is referred to in the arts as "clipping."

To prevent this undesirable clipping effect, some embodiments of the video output brightness adjustment system 100 may be configured to adjust image contrast such that the brightness level of the clipped data is reduced back into a range of brightness values that can be readily perceived by the user. Additionally, or alternatively, the level of gamma correction may be adjusted by embodiments of the video output brightness adjustment system 100 to improve the visibility of the image.

In FIG. 1, the exemplary media device 102 is communicatively coupled to a media presentation system 106 that includes a visual display device 108, such as a television (hereafter, generically a TV), and an audio presentation device 110, such as a surround sound receiver controlling an audio reproduction device (hereafter, generically, a speaker 112). Other types of output devices may also be coupled to the media device 102, including those providing any sort of stimuli sensible by a human being, such as temperature, vibration and the like. The video portion of the media content event is displayed on the display 104 and the audio portion of the media content event is reproduced as sounds by one or more speakers 112. In some embodiments, the media device 102 and one or more of the components of the media presentation system 106 may be integrated into a single electronic device.

The non-limiting exemplary media device 102 comprises a media content stream interface 114, a processor system 116, a memory 118, a program buffer 120, an optional digital video recorder (DVR) 122, a presentation device interface 124, a remote interface 126, and an optional light detector 128. The memory 118 comprises portions for storing the media device logic 130, electronic program guide (EPG) information 132, video brightness adjustment logic 134, video setting data 136, and the contrast and gamma correction tables 138. In some embodiments, the video media device logic 130 and the video brightness adjustment logic 134 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 140 multiplexed together in one or more transport channels. The transport channels with the media content streams 140 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 140 can be received from one or more different sources, such as, but not limited to, a cable system, a radio frequency (RF) communication system, or the Internet.

The one or more media content streams 140 are received by the media content stream interface 114. In a broadcast environment, one or more tuners 114a in the media content stream interface 114 selectively tune to one of the media content streams 140 in accordance with instructions received from the processor system 116. The processor system 116, executing the media device logic 130 and based upon a request for a media content event of interest specified by a user, parses out media content associated with the media content event of interest. The media content event of interest is then assembled into a stream of video and/or audio information which may be stored by the program buffer 120 such that the media content can be streamed out to components of the media presentation system 106, such as the visual display device 108 and/or the audio presentation device 110, via the presentation device interface 124. Alternatively, or additionally, the parsed out media content may be saved into the DVR 122 for later presentation. The DVR 122 may be directly provided in, locally connected to, or remotely connected to, the media device 102.

From time to time, information populating the EPG information 132 portion of the memory 118 is communicated to the media device 102, via the media content stream 140 or via another suitable media. The EPG information 132 stores the information pertaining to the scheduled programming of media content events. The information may include, but is not limited to, a scheduled presentation start and/or end time, a program channel, and descriptive information. The media content event's descriptive information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 132 is retrieved, formatted, and then presented on the display 104 as an EPG.

The exemplary media device 102 is configured to receive commands from a user via a remote control 142. The remote control 142 includes one or more controllers 144 disposed on the surface of the remote control 142. The user, by actuating one or more of the controllers 144, causes the remote control 142 to generate and transmit commands, via a wireless signal 146, to the media device 102. The commands control the media device 102 and/or control components of the media presentation system 106. The wireless signal 146 may be an infrared (IR) signal or a radio frequency (RF) signal that is detectable by the remote interface 126. In some embodiments, an optional light detector 148 resides on the surface of the remote control 142.

The processes performed by the media device 102 relating to the processing of the received media content stream 140 and communication of a presentable media content event to the components of the media presentation system 106 are generally implemented by the processor system 116 while executing the media device logic 130. Thus, the media device 102 may perform a variety of functions related to the processing and presentation of one or more media content events received in the media content stream 140. The processes of adjusting brightness output from the display 104 is generally implemented by the processor system 116 while executing the video brightness adjustment logic 134.

When an image is presented on the display 104 to the user, the user will perceive color characteristics of the presented image and brightness characteristics of the presented image. As is known in the arts, color is characterized by a combination of red, blue and green colors. Brightness is an attribute of visual perception relating to the amount of light that appears to be radiating from the presented image. Thus, the user can perceive an image based on relatively small regions of the image that have differing colors and that have differing brightness levels.

To facilitate transportation of the media content to the media device 102 in the communicated media content stream 140, the image data and the audio data may be transformed from an analogue domain into a digital domain. That is, the originally filmed video and audio information is converted into digital image and digital audio data. The digital data may then be compressed into a format that is suitable for communication within the media content stream 140. Any suitable digitization and compression technique may be used to process the media content for communication to the media device 102. For example, but not limited to, the data may be transported using one of the motion picture experts group (MPEG) standards, such as the MPEG-1 standard.

When the video information is initially converted into digital data, very small regions of an image are mathematically described using numerical information. The numerical information for each small region describes (defines) its brightness characteristic, its color characteristic, and its location in the image. Three digital numbers may be used to define, for each small region of the image, an amount of red color (R), and amount of green color (G), and an amount of blue color (B). Higher digital numbers correspond to increased brightness. The relative amount of the red, blue and green colors define the perceived color of the represented small region of the image. Thus, three numbers may be used to define both the brightness and the color of each represented small region of the image. When each small region of the image is reproduced in accordance with the brightness and color information, and when each small region of the image is placed in accordance with its location in the overall image, the user perceives the entirety of the presented image. This representation of the brightness and color information using a first number (a first coefficient) to represent the amount of red color, a second number (a second coefficient) to represent the amount of green color, and a third number (a third coefficient) to represent the amount of blue color is referred to in the arts as representing an image using a red-green-blue (RGB) color space.

However, digitally representing video information using RGB color space data is computationally inefficient. That is, a very large amount of data is required to represent each image. To reduce the amount of digital data required for image representation, the RGB color space data is converted into another digital data format. One example digital format compresses the digital data into a YCbCr color space.

The brightness and color information of each small region of the image, originally defined in a RGB color space, is encoded (interchangeably referred to as mapping) into digital data in accordance with the YCbCr color space of Equation 1.

RGB→YCbCr  (Eq. 1)

The Y coefficient is the luma component of the YCbCr color space equation, and defines the brightness for that particular small region of the image. The Cb coefficient is the blue-difference chroma component and Cr coefficient is the red-difference chroma component for the corresponding small region of the image. The equations used to transform image information from the RGB color space into the YCbCr color space are well known to one skilled in the arts.

When the video information is communicated to the display 104, small colored light emitting elements in the display are actuated to emit light in accordance with the specified brightness level and color for that small region of the image. These small color emitting elements may be referred to as pixels. Thus, when the color emitting elements, each having known locations on the display 104, receive the brightness and color information for their particular location in the display 104, an image is generated and is presented to the user who is viewing the display 104.

Figure 2:
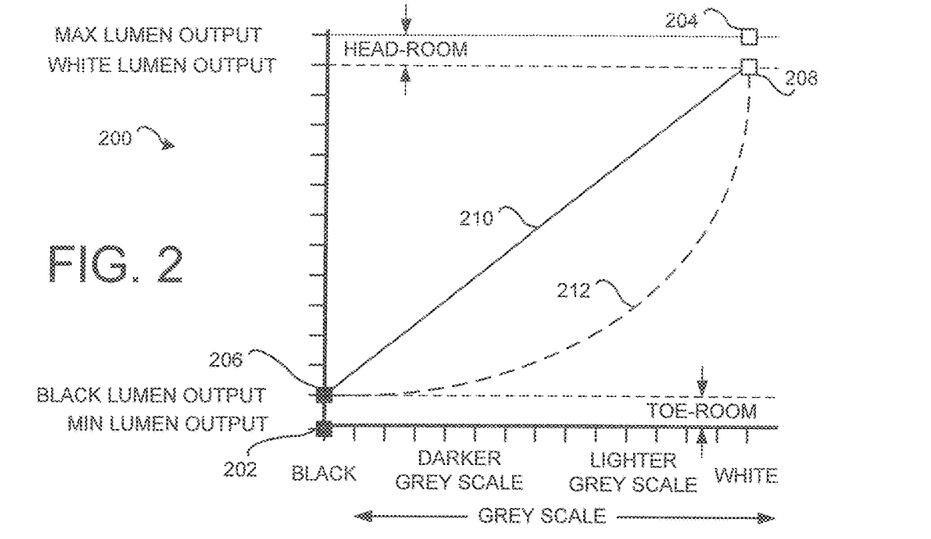
FIG. 2 conceptually illustrates a graphical representation of an example luminance curve.

FIG. 2 conceptually illustrates a graphical representation 200 of an example luminance curve, conceptually shown as a curve in the YCbCr color space. Similar color space graphical representations are equally applicable to other spaces such as, but not limited to, black and white (Y only) space, a hue saturation value (HSV) space, and other colors spaces, such as a red, green, blue additive color model and its association with the cyan, magenta, yellow subtractive color model (RGBCMY) space. The luminance curves may be applicable to analog or digital format interfaces.

Generally, lumen output for a black color corresponds to a complete absence of light. To illustrate, an ideal black pixel 202 is represented at the origin of the graph 200. Here, the ideal black pixel 202 would correspond to an output of no light from the display pixel, and is defined to have a digital value of "0" by convention. The ideal white pixel 204 is defined as outputting a maximum amount of white light from the display pixel, and is defined to have a digital value of "250" by convention.

Digital representation of the lumen range adopted under accepted industry standards has added an amount of margin to the ideal black digital value and ideal white digital value. The margin results in a more pleasing perception by the user of a presented digital image. The margin also reduces the likelihood of clipping when RGB image information is converted into to the YCbCr digital format.

In an example digitization format, an amount of toe-room is used to limit the maximum digital value used to represent a black color using a value of 15, as conceptually illustrated by the black pixel 206. An amount of head-room is used to limit the maximum digital value used to represent a white color using a value of 235, as conceptually illustrated by the white pixel 208. Thus, a digital value selected along the straight line curve 210 may be used to define any level of grey scale. When the YCbCr color space defines pixel brightness and color information along the straight line curve 210, the YCbCr color space equation is referred to as an absolute color space by one skilled in the arts of imaging technologies.

However, the human eye does not perceive degrees of light and color information in accordance with the exemplary straight line curve 210. Rather, the human eye perceives light and color information on a nonlinear scale which may be approximated using a logarithmic function. Accordingly, an improved digitization process employs a nonlinear correction factor during the digitization process. The nonlinear correction is referred to in the arts as gamma correction (or interchangeably, as gamma nonlinearity, gamma encoding, or simply gamma). Equation 2 may be used to generally describe the gamma correction function.

$$V_{out} = A V_{in}^{\gamma}$$  (Eq. 2)

$V_{out}$ corresponds to the gamma corrected output value of a pixel defined by its digital YCbCr color space data. $V_{in}$ is the input digital value of the YCbCr color space data. A is a constant (typically in the arts, A=1). The value of gamma (γ) is typically greater than a value of one.

The gamma corrected values of the Y'CbCr color space data may be conceptually represented by the curve 212, with is typically a logarithmic curve. Thus, a relatively small incremental change (adjustment) in the digital data values that represent a darker grayscale is readily perceptible by the human eye, whereas a greater incremental change in the digital data values is required for a perceptible change for the lighter grayscales.

The brightness and color information of each small region of the image, originally defined in a red-green-blue (RGB) color space, is encoded (mapped) into digital data in accordance with the color space Equation 3 below.

$$RGB \rightarrow Y'CbCr \qquad (Eq.\ 3)$$

The gamma corrected Y'CbCr color space equation above that defines brightness and color information for the small portions of an image. The Y' coefficient is the gamma corrected luma component of the Y'CbCr color space equation, and defines the gamma corrected value of brightness for that particular small region of the image.

Figure 3:
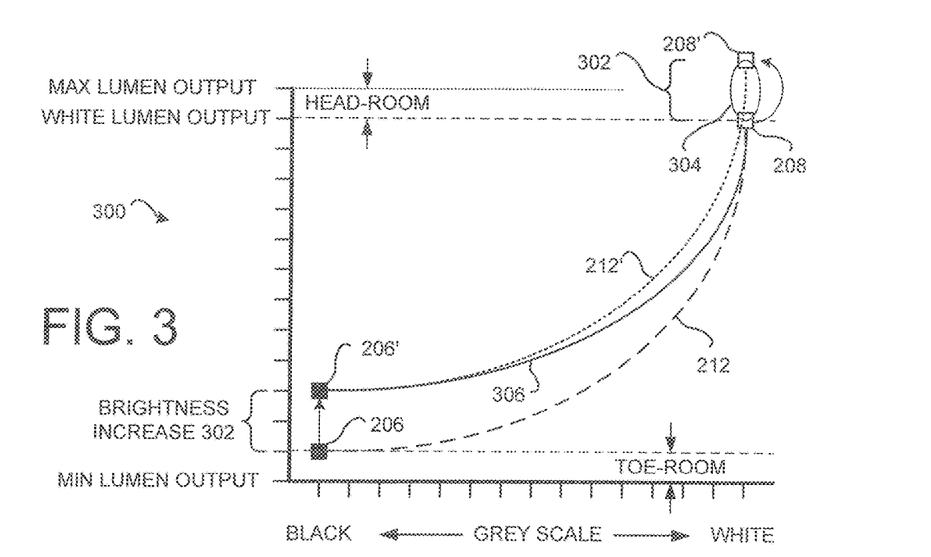
FIG. 3 conceptually illustrates a graphical representation of the gamma corrected Y'CbCr color space with a brightness adjustment made by an embodiment of the video output brightness adjustment system.

FIG. 3 conceptually illustrates a graphical representation 300 of the gamma corrected Y'CbCr color space with a brightness adjustment made by an embodiment of the video output brightness adjustment system 100. Gamma correction may be equally applicable in other color spaces as noted herein above.

Here, a brightness increase corresponding to a brightness increase value 302 is used to change (increase) the value of the gamma corrected Y' coefficient from a first value to a second value, wherein the first value of the gamma corrected Y' coefficient is received in the original image data, and wherein the second value is greater than the first value by a predefined amount of the brightness increase value 302. Thus, the entire curve 212 is shifted upwards (by the amount of the brightness increase value 302) to the curve 212'.

In an example embodiment, the digital value of the gamma corrected Y' coefficient is increased by a predefined amount that corresponds to the brightness increase value 302. The digital value used to increase the gamma corrected Y' coefficient is a predefined value stored in the video setting data 136 portion of memory 118 (FIG. 1). (In alternative embodiments, the digital value may be stored in any suitable memory medium and/or in any suitable location.)

For example, the brightness increase value 302, when applied to the gamma corrected Y' coefficient of the previously described black pixel 206 (see also FIG. 2), results in a pixel 206'. The brightness increase value 302, if applied to the gamma corrected Y' coefficient of the previously described white pixel 208, results in a white pixel 208'. Accordingly, when the video portion is streamed out from the presentation device interface 124 for presentation on the display 104, the brightness of all of the gamma corrected Y'CbCr color space data has been increased by the brightness increase value 302, as indicated by the curve 212' (wherein the locations of each point on the curve 212 has been shifted upward by the amount of the brightness increase 302).

When the brightness of the presented image is adjusted as described above, the increased output brightness from the display 104 will increase the amount of radiated ambient light that is present in the vicinity of the display 104. The increase in ambient light improves visibility of objects, such as when the user is looking at the remote control 142. Accordingly, the user is more able to discern the controllers 144 on their remote control 142. Further, the user is able to better discern other objects and/or obstructions in the event that the user is moving about the media room and/or if they wish to better see an object that they would like to grasp.

However, one skilled in the art appreciates that although brightness output from the display 104 has been increased by embodiments of the video output brightness adjustment system 100, some portions of the presented image may become washed out due to clipping. That is, those small portions of the image that were on the lighter side of the grey scale range may become washed out as their brightness level is increased towards the brighter white lumen output level, conceptually illustrated as being in the region 304 on the curve 212'.

In some embodiments, an adjustment to contrast is made to the gamma corrected Y'CbCr color space concurrently with the increased brightness adjustment. Contrast of an image is the separation between the darkest and the brightest areas of an image. Contrast may be defined as a ratio of the luminance (brightness level) between the brightest white pixel and the darkest black pixel.

Thus, some embodiments of the video output brightness adjustment system 100 may be configured to reduce the contrast of the image data so that the brightness levels of the otherwise clipped data is reduced to values that are perceivable by the user who is viewing the image presented on the display 104.

In an example embodiment, a scaling of the brightness values of the gamma corrected Y'CbCr color space is made using contrast settings. Electronic displays 104 have various control setting that are used to control image quality. Two non-limiting examples of controllable settings are image brightness and image contrast. During normal presentation of video content on the display 104 (when the video output brightness adjustment system 100 is not operating to increase brightness of the presented image), the image brightness and image contrast settings for the particular display 104 are predefined to values that result in presentation of an image that has pleasing brightness and contrast characteristics. An example embodiment, when implemented in a television or the like that includes a display 104 as an integral component, adjusts both brightness and contrast settings when the brightness output is increased.

To illustrate contrast adjustment, the contrast ratio is reduced so that the brightness of the pixel 208' is scaled down to the original level of the brightness of the pixel 208. Thus, the exemplary contrast scaling reduces the brightness of all pixels in accordance with the illustrated curve 306. In the various embodiments, any suitable type of and amount of contrast adjustment may be made.

One skilled in the art appreciates that the contrast adjustment will result in a decrease in the overall output brightness of the image presented on the display 104. However, the net amount of the brightness increase with contrast adjustment may be selected so that a sufficient amount of increased light output from the display 104 occurs so as to improve visibility of objects in the media room. In an example embodiment, a value defining the amount of the contrast adjustment is a predefined value stored in the contrast and gamma correction tables 138 portion of memory 118 (FIG. 1). (In alternative embodiments, the value of the contrast adjustment may be stored in any suitable memory medium and/or in any suitable location.)

Figure 4:
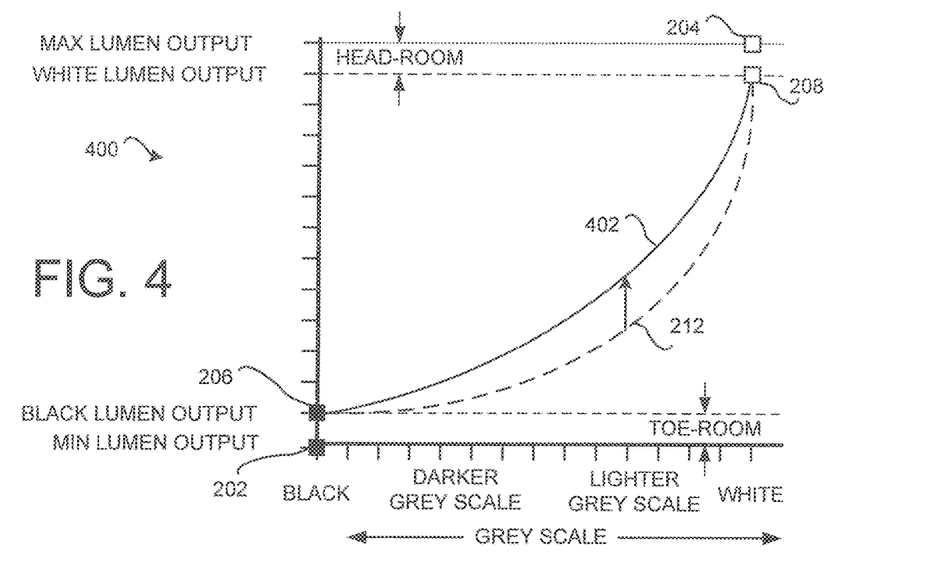
FIG. 4 conceptually illustrates a graphical representation of an additional gamma adjustment made to the gamma corrected Y'CbCr color space data made by an embodiment of the video output brightness adjustment system.

FIG. 4 conceptually illustrates a graphical representation 400 of an additional gamma adjustment to the gamma corrected Y'CbCr color space data made by an embodiment of the video output brightness adjustment system 100. Alternatively, or additionally, embodiments may make a gamma value adjustment to the image data in conjunction with the increase in brightness (and optionally, with the above-described contrast adjustment). The additional gamma adjustment may be equally applicable in other color spaces as noted herein above.

Here, the additional gamma correction, denoted by the curve 402, increases brightness of the output image presented on the display 104. Adjustment to the gamma value changes the shape of the logarithmic curve, such as a change from the example curve 212 to the example curve 402.

In an example embodiment, the gamma corrected Y'CbCr color space may be mapped to a gamma corrected Y"CrCb color space in accordance with Equation 4.

$$Y'CbCr \rightarrow Y''CbCr \qquad (Eq. 4)$$

Here, a gamma value adjustment is made by an example embodiment during decoding of the gamma corrected Y'CbCr color space data from the gamma value $\gamma$ to the adjusted gamma value $\gamma'$. As noted above, the RGB information of encoded into the gamma corrected Y'CbCr color space for communication of the image data in the media content stream 140. The processor system 116, decodes the received media content stream such that digital data is stored in the program buffer 120. During the processing of the media content stream data, the decoded gamma corrected Y'CbCr color space data is adjusted by the new gamma value $\gamma'$ to generate the Y"CbCr color space data. This buffered digital data Y"CbCr is then streamed out from the presentation device interface 124 for presentation on the display 104. In an example embodiment, the values of the additional gamma correction $\gamma'$ are stored in the contrast and gamma correction tables 138 portion of memory 118 (FIG. 1). (In alternative embodiments, the additional gamma correction $\gamma'$ information may be stored in any suitable memory medium and/or in any suitable location.

In some embodiments, an analog data stream may be generated from a decoding of the gamma corrected Y'CbCr color space data. Here, the Vout is the value of the output data communicated to the display 104. Equation 5 illustrates that the additional gamma correction $\gamma'$ information may be substituted for the original gamma correction $\gamma$ information when the output data is generated.

$$A V_{in}^{\gamma'} = V_{out} \qquad (Eq. 5)$$

In the various embodiments of the video output brightness adjustment system 100, the brightness increase is made in response to detecting a predefined user action of a user. A brightness increase to a currently presented image is initiated in response to detecting one of a plurality of predefined user actions corresponding to operation of the remote control 142 that controls operation of at least one of the media device 102, the display 104, and a component of a media presentation system 106.

The predefined user action tends to indicate that an increase in ambient lighting conditions in the vicinity of the display 104 would assist the user in performing some task, such as operating a controller, grasping an object, and/or moving about the media space. In an example situation, the brightness increase is made in response to a user action that is specifically intended by the user to increase the brightness levels of the image output from the display 104.

Preferably, the brightness increase is initiated in response to detecting a single predefined user action. Other user actions are not intended to initiate an automatic brightness increase. In some situations, there is (inherently) an absence of the use of the remote control 142, at least for some duration, prior to the predefined user action that initiates the brightness increase.

As an example of user actions that are not intended to initiate an automatic brightness increase, some media devices 102 and/or displays 104 may be configured to permit the user to make fixed adjustments of one or more presentation attributes, such as, but not limited to, image brightness and/or contrast settings. The user performs a series of operations using the remote control 142, such as by navigating through a presented graphical user interface to make fixed adjustments to the image brightness and/or contrast settings. Accordingly, further presentation of images and/or video content is made in accordance with the defined fixed adjustments made to the image brightness and/or contrast settings. When the user is making these type of fixed adjustments to one or more image presentation attributes, the video output brightness adjustment system 100 does not operate to automatically increase the brightness of the currently presented image.

Rather, the video output brightness adjustment system 100 is operable to initiate a brightness increase in response to one of a plurality of predefined user actions. In some embodiments, a list of predefined user actions for which a brightness increase is initiated is preferably predefined prior to use of the media device 102 by the user for presentation of media content. The listing of the predefined user actions is saved in the video setting data 136 or in another suitable location.

In an example embodiment, the video output brightness adjustment system 100 monitors activity at the media device 102 for an occurrence of one of the predefined user actions. At some point, a user action of the remote control 142 is detected. Then, the detected user action is compared with the stored listing that identifies the plurality of predefined user actions. The user action is identified as a predefined user action when the detected user action matches with one of the plurality of predefined user actions. The brightness increase is then initiated. Other detected user actions that do not correspond to one of the plurality of listed user actions do not cause the video output brightness adjustment system 100 to increase the output brightness.

These predefined user actions preferably occur when the user is likely viewing the image or video content on their display 104 for recreational purposes. In such situations, the user may be preparing to use their remote control 142 to control some operation of interest at their media device 102, control operation of the display 104, and/or control operation of a component of the media presentation system 106.

The user, for example, may be intending to use their remote control 142 to change channels to different media content events, initiate presentation of an EPG on the display 104, adjust the current volume setting of the audio output, or use their media device for another purpose, such as to access a web site or access on-demand content. Here, the user is not using their remote control to make a fixed adjustment to one or more presentation attributes.

However, at the time that the predefined user action is detected, the ambient lighting conditions in the media room may be sufficiently low such that the user is likely to have difficulty discerning the controllers 144 and/or the denoted controller functions. That is, the user may not be able to clearly see the controllers 144 and/or the noted functions of the controllers 144 because of the relatively low ambient lighting conditions. With additional ambient (background) lighting in the media room, the user would then be able to more clearly discern the controllers 144 and/or the noted functions of the controllers 144.

Alternatively, or additionally, the user may be intending to perform some other task that may be otherwise be more difficult to perform in the absence of the increased brightness output from the display 104. For example, the user may wish to move about the media room while avoiding obstructions. As another non-limiting example, the user may wish to grasp some object, such as a beverage class or can, or a bowl of popcorn. As yet another example, the user may wish to view a printed program guide or other form of printed media. In such situations, the user may, via their remote control 142, cause the video output brightness adjustment system 100 to initiate an increase in the output brightness of the image to assist the user in performing the task of interest.

Embodiments are configured to detect an initial actuation of one or more of the controllers 144 of the remote control 142 (after some period of non-use of the remote control 142). In an example embodiment, a specific one of the controllers 144 has been predefined (designated) to have a dedicated function of initiating the brightness increase. In response to detecting the initial (first) actuation of the designated controller 144, the video output brightness adjustment system 100 operates to increase the brightness of the presented image. That is, the user simply actuates a particular designated one of the controllers 144 to cause an increase in the output brightness of the image. Actuation of the other controllers 144 on the remote control 142 does not initiate a brightness increase.

In some embodiments, actuation of any one of a plurality of predefined controllers 144 will initiate the brightness increase. In such embodiments, actuation of any one of the plurality of predefined controllers 144 initiates the brightness increase (while actuation of other controllers 144 does not initiate the brightness increase).

In embodiments that have a dedicated one of the controllers 144 for initiation of the brightness increase, the amount of increase in output brightness may be controllable by the user by successive subsequent actuations of the predefined controller 144. Here, a plurality of increasing brightness levels may be used to provide a stepwise increase in brightness output for each subsequent actuation of the predefined controller 144. The subsequent actuations of the predefined controller must occur within some predefined duration of each other, such as a few seconds or the like. For example, a first actuation of the predefined controller 144 initiates a first increase in brightness. A subsequent second actuation of the predefined controller 144 made within the predefined duration increases the brightness output to a second higher level of brightness output. Such embodiments may employ any number of predefined incremental increases in brightness output for each subsequent actuation of the predefined controller 144.

As noted above, an increase in the output brightness of the image increases the ambient light level in the media room. However, increasing the output brightness of the image may be desirable only when the ambient lighting conditions in the media room are relatively low. At other times when the ambient lighting conditions in the media room are relatively high, the user may find that increasing the output brightness of the image provides no discernible benefit. For example, the media room may be a living room, bedroom, or the like that has one or more windows to the outside environment. During daylight hours, sufficient daylight may be entering into the media room such that an increase to the output brightness of the image provides no discernible benefit to the user. Further, increasing the output brightness of the image may actually be a distraction to the user in this situation.

Accordingly, embodiments of the video output brightness adjustment system 100 are configured to only increase the output brightness of the image in response to the user selectively activating the video output brightness adjustment system 100. That is, brightness adjustments are initiated only after the use has activated the video output brightness adjustment system 100.

After the video output brightness adjustment system 100 has been activated (turned on) by the user, detection of the particular predefined user action (such as by the user's initial actuation one of more of the controllers 144 on the remote control 142) initiates the brightness increase. After the video output brightness adjustment system 100 has been deactivated (turned off), that same user action will not initiate an increase in the output brightness of the image. In an example embodiment, one or more of the controllers 144 on the remote control 142 may be configured to activate and deactivate the video output brightness adjustment system 100.

Figure 5:
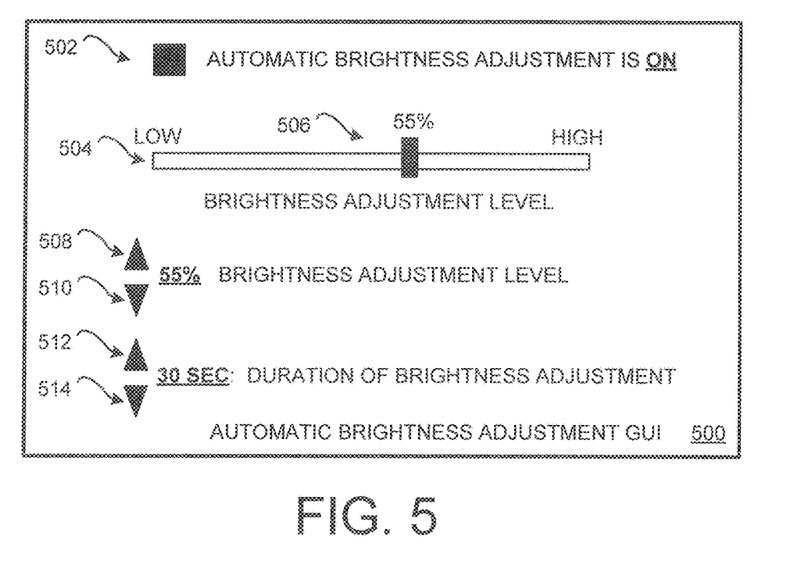
FIG. 5 is an example input user brightness adjustment setup GUI configured to provide user control of the video output brightness adjustment system.

Alternatively, or additionally, a brightness adjustment setup graphical user interface (GUI) 500 may be presented on the display 104 to permit the user to selectively activate and deactivate the video output brightness adjustment system 100. FIG. 5 is an example brightness adjustment setup GUI 500 configured to provide user control of the video output brightness adjustment system 100. The user may navigate to a particular selectable region 502 on the presented brightness adjustment setup GUI 500 to activate or deactivate (turn on/off) the video output brightness adjustment system 100. The current operating status (activated/on or deactivated/off) may be indicated on the presented brightness adjustment setup GUI 500. For example, the black fill on the selectable region 502 is understood by the user to indicate that the video output brightness adjustment system 100 is activated. Any suitable fill color and/or pattern may be used.

Alternatively, or additionally, text may be presented to the user to indication the operating status of the video output brightness adjustment system 100. Here, the text "ON" indicates to the user that the video output brightness adjustment system 100 is currently activated.

In the example brightness adjustment setup GUI 500, a user selection of the selectable region 502 on the presented brightness adjustment setup GUI 500 will deactivate the video output brightness adjustment system 100. The textual indication, if used, is also changed (such as to "OFF" or the like)

Alternatively, or additionally, the current level of the ambient lighting conditions within the media room may be detected by embodiments of the video output brightness adjustment system 100. In such embodiments, the light detector 128 is disposed on the surface of the media device 102 at a location that permits detection of the current level of ambient lighting in the vicinity of the media device 102.

If the currently detected ambient lighting level is above (greater than, or at least equal to) a threshold lighting level, then the video output brightness adjustment system 100 will not be operable to cause an increase in the output brightness of the image. That is, when the detected ambient light level is greater than or equal to the threshold lighting level, the video output brightness adjustment system 100 is deactivated. If the detected ambient lighting level is below (less than) the threshold lighting level, then the video output brightness adjustment system 100 is activated and will then become operable to increase the output brightness of the image.

Alternatively, or additionally, the light detector 148 disposed at a suitable location on the surface of the remote control 142 is configured detect the ambient lighting level in the vicinity of the remote control 142. In this embodiment, the remote control 142 communicates the lighting level information corresponding to the detected lighting level to the media device 102 via the wireless signal 146. The video brightness adjustment logic 134 may then determine the ambient lighting level, and then may activate or deactivate itself based on the received ambient lighting level information.

In another embodiment, the command to cause an increase in the output brightness of the image is communicated in the wireless signal 146 to the media device 102 only at times when the ambient lighting level, as detected by the light detector 148 of the remote control 142, indicates that the increased output brightness of the image is desirable (and therefore, is less than the threshold lighting level). In this embodiment, the remote control 142 determines when to initiate the brightness increase based on the detected ambient lighting level. Accordingly, such embodiments of the remote control 142 include a processor to determine and compare current lighting levels with a threshold lighting level stored in a memory of the remote control 142.

In such embodiments, the wireless signal 146 with a command to initiate a brightness increase is only generated by the remote control 142 and transmitted to the media device 102 when the currently detected ambient lighting level is less than the threshold lighting level. When the currently detected ambient lighting level is equal to or greater than the threshold lighting level, the wireless signal 146 with the command to initiate a brightness increase in not generated and communicated. Here, the portion of the video output brightness adjustment system 100 residing in the media device 102 is continuously activated, but only operates to increase brightness if an instruction to increase brightness is received from the remote control 142.

The threshold lighting level that activates/deactivates the video output brightness adjustment system 100 may be predefined by the manufacturer of the media device 102. Alternatively, or additionally, the value of the threshold lighting level may be specified by the user. The value of the threshold lighting level may be stored in the video setting data 136 portion of the memory 118. In embodiments where the user specifies the value of the threshold lighting level at which a brightness increase is initiated, a brightness adjustment setup GUI 500 may be presented to the user. The user may specify the threshold lighting level via the brightness adjustment setup GUI 500 in any suitable manner.

In some embodiments, a clock, time device, or the like may be used to activate and deactivate the video output brightness adjustment system 100. That is, a time of day is used to activate and deactivate the video output brightness adjustment system 100.

For example, the time of dusk and/or dawn may be known or may be estimated. When the media device 102 is being used after dusk, and therefore is presumably being used at night, the video output brightness adjustment system 100 may be activated (until the time that dawn arrives, when the video output brightness adjustment system 100 becomes deactivated). Alternatively, the brightness adjustment setup GUI 500 may be configured to permit the user to specify particular times of the day that the video output brightness adjustment system 100 is to be activated and deactivated.

In some embodiments, the user may specify a desired brightness increase value (amount) via the brightness adjustment setup GUI 500. Any suitable form of input may be used on a presented brightness adjustment setup GUI 500. In an example embodiment, a slidable bar indicator 504 may be presented to the user. The user may navigate about the presented brightness adjustment setup GUI 500 to adjust the position of an indicator 506 on the slidable bar indicator 504 to specify the desired brightness increase value. A textual indicator, here illustrated as hovering above the indicator 506, may be presented to the user indicating the value of the brightness increase value that the user has selected. The textual indicator indicating the specified brightness level may be located at other places on the brightness adjustment setup GUI 500. The brightness increase value may be stored in the video setting data 136 portion of the memory 118.

Alternatively, or additionally, a numerical value corresponding to the brightness increase value may be indicated on the brightness adjustment setup GUI 500. The user may navigate a pointer or the like (not shown) to the controller region 508 to increase the user specified brightness increase value. Here, the controller region 508 is shown as an upward pointing arrow or the like to intuitively indicate to the user that selection of the controller region 508 will increase the current value of the user selection for the brightness increase value. Similarly, controller region 510 is configured to decrease the user specified brightness increase value. Here, the controller region 510 is shown as a downward pointing arrow or the like to intuitively indicate to the user that selection of the controller region 510 will decrease the current value of the user selection for the brightness increase value. The value of the user selected brightness increase may be stored in the video setting data 136 portion of the memory 118.

In some embodiments, during specification of the brightness increase value by the user, a test image may be concurrently presented on the display 104 with the brightness adjustment setup GUI 500. The output brightness of the presented test image may be dynamically adjusted as the user adjusts the brightness increase value via the brightness adjustment setup GUI 500. Any suitable test image (a still image or a video image) may be used. Here, as the user increases the brightness increase value via the brightness adjustment setup GUI 500, the output brightness of the test image is increased. Conversely, as the user decreases the brightness increase value, the output brightness of the test image is decreased. Accordingly, the user will better appreciate the magnitude of the brightness adjustment that is being selected by the user.

In some embodiments, the amount of the increased output brightness of the image may be adjusted based on one or more characteristics of the presented media content event. For example, some media content events may have relatively darker scenes, such as when a particular scene is filmed (captured) outdoors during the night. Other scenes may be very bright, such as when filmed outdoors during the day. Further, scene features may impact the amount of emitted light. For example, a scene filmed during the day at a desert or at a beach may be substantially brighter than a daylight scene that has been filmed at a park or in the jungle having a thick overhead tree canopy.

Accordingly, an embodiment may be configured to analyze the brightness level of a currently presented scene (image) of the video of interest. For example, but not limited to, the Y' value of the gamma corrected Y'CbCr color space may be analyzed to determine an amount of light that will be normally output from the display 104 as that particular scene is being presented. Then, if the brightness value of the gamma corrected Y'CbCr color space is increased, the amount of the brightness increase may be scaled accordingly based on the current brightness. Here, a difference is determined between the brightness level of the currently presented image and a threshold brightness level. The amount of the brightness increase corresponds to, or may be the same as, the determined difference.

That is, if the current brightness of the currently presented scene is high, the brightness increase (and optionally, the contrast adjustment and/or gamma value adjustment) may be relatively less. Conversely, if the current brightness of the scene is relatively low, the brightness increase (and optionally, the decrease in the contrast and/or the gamma value adjustment) may be relatively greater.

In another example embodiment, the current brightness of the scene is normalized against some predefined value. Then, then amount of brightness increase (and optionally, the amount of contrast adjustment and/or gamma value adjustment) is made based on the normalized scene brightness.

For example, if the currently presented image or scene brightness is determined to be at a first normalized value, a first brightness increase value and/or a first contrast value decrease may be used to adjust the gamma corrected Y'CbCr color space data. If an adjustment in the image or scene brightness is determined (and is computed to be at a second normalized value), a second brightness increase value and/or a second contrast value decrease may be used. If the first current scene is brighter than the second current scene, the first brightness increase value would be less than the comparable second brightness increase value. And, the first contrast value decrease would be less than the second contrast value decrease. Such dynamic determination of the applied brightness increases and the associated contrast adjustments result in a more pleasing appearance of the presented video scenes.

In embodiments that employ the light detector 128 at the media device 102 and/or the light detector 148 on the remote control 142, real-time changes in ambient light conditions after the initiation of the brightness increase may be optionally determined. If the determined adjustment in image brightness (the difference in the before and after adjustment in ambient lighting) does not exceed a threshold value, and/or does not at least exceed a threshold value, then embodiments of the video output brightness adjustment system 100 may dynamically operate to further increase the brightness level. That is, if the brightness increase is not sufficient, a greater brightness increase may be made. Accordingly, at least some minimum level of increase in the brightness of the ambient light may be enforced by the video output brightness adjustment system 100.

In some embodiments, the increased brightness level is maintained for a predefined duration. After the end of the predefined duration, the brightness increase ends such that brightness is decreased to original brightness levels so that normal presentation of the video content on the display 104 resumes. In the various embodiments, the duration of the brightness increase is based on an assumption of the time that the user is likely to need the additional light to perform a specific task. For example, the brightness increase may last five seconds, ten seconds, or the like, thereby providing the additional brightness for a duration that permits sufficient time for the user to view the controllers 144 on the remote control and/or to grasp an object.

In some embodiments, the duration of a brightness increase is predefined at the time of manufacture of the media device 102. Alternatively, or additionally, the duration of a brightness increase may be adjustable. In an example embodiment, the brightness adjustment setup GUI 500 is configured to permit the user to specify the duration of a brightness increase. A numerical value corresponding to the duration of a brightness increase, here shown to be thirty (30) seconds, may be indicated on the brightness adjustment setup GUI 500. The user may navigate to the controller region 512 to increase the user specified value of the duration of a brightness increase. Here, the controller region 512 is shown as an upward pointing arrow or the like to intuitively indicate to the user that selection of the controller region 512 will increase the current value of the user selection for the duration of the brightness increase. Similarly, controller region 514 is configured to decrease the user specified value of the duration of the brightness increase. Here, the controller region 514 is shown as an downward pointing arrow or the like to intuitively indicate to the user that selection of the controller region 514 will decrease the current value of the duration of the brightness increase. The value of the user selected duration may be stored in the video setting data 136 portion of the memory 118.

Alternatively, controllers 144 on the remote control that are associated with particular numerals (numbers) may be used to specify the duration of a brightness increase. For example, if a duration of a brightness increase of thirty seconds is desired, the user may actuate the particular controller 144 associated with the numeral three (3), and then actuate the particular controller 144 associated with the numeral zero (0). Thus, the user may specify "30" using the controllers 144 to set the duration of a brightness increase to thirty seconds.

As noted above, some embodiments may have a dedicated one of the controllers 144 on the remote control 142 that is configured to initiate a brightness increase. In such embodiments, the duration of a brightness increase may be predefined to a particular duration. A series of actuations of the dedicated controller 144 may be used to define the total duration of the brightness increase. For example, but not limited to, the predefined duration of a brightness increase may be five seconds. If the user desires fifteen seconds of brightness increase, the user would actuate the dedicated controller three times (wherein three actuations corresponds to selection of three five second durations of brightness increase).

One skilled in the art appreciates that different types of displays 104 respond differently to changes in brightness output, to changes in contrast, and/or to changes in the gamma coefficient. Example types of displays 104 include projection TVs, plasma displays, liquid crystal displays (LCDs), cathode ray tubes (CRTs). Embodiments of the video output brightness adjustment system 100 are configured to select particular changes in brightness, contrast, and/or gamma correction based on the particular type of display 104 that is being used to present images and/or video content to the user. The data corresponding to the various changes in brightness, contrast, and/or gamma correction for particular types of the display 104 may be stored in tables or the like in the contrast and gamma correction tables 138 portion of memory 118, or in another suitable memory location. That is, the determined type of display 104 is compared with a listing of display types, wherein each of the listed display types is associated with at least one characteristic that defines brightness of an image when the image is presented by that display type. Accordingly, brightness of the currently presented image is increased based on the at least one of the characteristics associated with the determined display type.

Some embodiments may be configured to automatically detect the type of display 104 that is being used. For example, High-Definition Multimedia Interface (HDMI) compatible components are configured to exchanged device identifier information with each other. Accordingly, the media device 102 may automatically determine the type of display 104 that it is providing images or video content to based on identity information that is exchanged between devices under the HDMI protocols.

Alternatively, or additionally, the brightness adjustment setup GUI 500 may be configured to permit the user to specify the type of the display 104. For example, a menu, listing, or the like of commonly available displays 104 may be presented to the user. During setup of the video output brightness adjustment system 100, the user would select one of the identified display types via the brightness adjustment setup GUI 500. Then, the data corresponding to the designated display 104 may be accessed to obtain display-specific changes in brightness, contrast, and/or gamma correction when the brightness output adjustment is made by that particular display 104.

In some situations, a plurality of users may be using the media device 102. Some embodiments of the video output brightness adjustment system 100 may be configured to use different levels of brightness, contrast, and/or gamma adjustments that are particularly pleasing to a particular identified user. Any suitable apparatus or process of identifying a particular user may be employed by such embodiments. Then, particular levels of brightness, contrast, and/or gamma adjustments for each different user may be stored in memory 118. In an example embodiment, the brightness adjustment setup GUI 500 is configured to receive a specification of a user identity. Thus, the user may configure the setup of the video output brightness adjustment system 100 so that their favorite levels of brightness, contrast, and/or gamma adjustments are used when a brightness increase is made.

In some embodiments, the detected predefined user action may be when the user initially is picking up and/or touching the remote control 142. In an example embodiment, a motion detection circuit detects motion of the remote control 142. Here, movement of the remote control 142 may be associated with some forthcoming user action, such as picking up the remote control prior to use. Alternatively, or additionally, any suitable biometric detector may be used to detect contact of the user to the remote control 142. Thus, then the user picks up or otherwise initially touches the remote control 142, a brightness increase is initiated.

It should be emphasized that the above-described embodiments of the video output brightness adjustment system 100 are merely possible examples of implementations of the invention. Many variations and modifications may be made to the above-described embodiments. For example, saturation, sharpness and or tome mapping adjustments may be made in addition to brightness and/or contrast adjustments to further control image characteristics. All such modifications and variations are intended to be included herein within the scope of this disclosure and protected by the following claims.

The invention claimed is:

1. A method, comprising:
receiving a media content stream at a media device, wherein the media content stream includes a media content event with at least a video portion;
communicating the media content event from the media device to a component of a media presentation system that is communicatively coupled to the media device, wherein the media device comprises a presentation device interface,
wherein the component of the media presentation system comprises a display,
wherein the communicated media content event is streamed out from the presentation device interface of the media device to the display of the component of the media presentation system as a stream of content,
wherein the streaming video portion of the media content event is communicated as digital data using one of a YCbCr color space or a Y'CbCr color space, where Y is a first coefficient that is a luma component of the YCbCr color space, where Cb is a second coefficient that is a blue-difference chroma component of the YCbCr color space, where Cr is a third coefficient that is a red-difference chroma component of the YCbCr color space, and where Y' is a fourth coefficient is a gamma corrected luma component of the Y'CbCr color space, and
wherein the component of the media presentation system includes a display that presents the received digital data defined by the YCbCr color space or the Y'CbCr color space of the streaming video portion of the media content event to a user;
detecting, during presentation of the media content event to the user, a predefined user action of a remote control that controls operation of at least one of the media device, the display, and another component of the media presentation system;
detecting an ambient light level using a light detector;
comparing the detected ambient light level with a predefined threshold lighting level to determine a difference between the detected ambient light and the predefined threshold lighting level;
increasing, at the media device and in response to detecting the predefined user action, an original value of one of the first coefficient corresponding to Y of the YCbCr color space or the fourth coefficient corresponding to Y' of the YCbCr color space to an increased value, wherein the increased value increases brightness of a currently presented image that is being presented on the display by the determined difference between the detected ambient light and the predefined threshold lighting level; and
continuing to communicate the media content event from the presentation device interface of the media device to the display of the component of the media presentation system, wherein the communicated media content event is streamed out from the presentation device interface of the media device using the increased value of the first coefficient corresponding to Y of the YCbCr color space or the fourth coefficient corresponding to Y' of the YCbCr color space,
wherein an ambient lighting level in the vicinity of the user is increased such that the user of the remote control is able to more clearly discern a plurality of controllers on the surface of the remote control and more clearly discern a denoted controller function associated with each of the plurality of controllers on the surface of the remote control.

2. The method of claim 1, wherein detecting the predefined user action comprises:
detecting a user action of one of the plurality of controllers on the surface of the remote control;
comparing the detected user action with a stored listing that identifies a plurality of predefined user actions; and
identifying the user action as the predefined user action when the detected user action matches with one of the plurality of predefined user actions.

3. The method of claim 1, wherein each small region of the image is defined by the fourth, the second and the third coefficients, respectively, in the Y'CbCr color space, and wherein increasing brightness of the currently presented image comprises:

adjusting a value of a gamma corrected fourth coefficient Y' from a first value to a second value,
wherein the first value of the gamma corrected fourth coefficient Y' is received in original image data, and
wherein the second value is greater than the first value by a predefined amount.

4. The method of claim 3, further comprising:
reducing a contrast of the currently presented image concurrently with increasing the brightness of the currently presented image.

5. The method of claim 3, further comprising:
adjusting a gamma value from a first value γ to a second value γ',
wherein the first value γ is used to encode the original image data in the Y'CbCr color space, and
wherein the second value γ' is used to decode the original image data in the Y'CbCr color space.

6. The method of claim 1, further comprising:
reducing a contrast of the currently presented image concurrently with increasing the brightness of the currently presented image.

7. The method of claim 1, wherein each small region of the image is defined by the fourth, the second and the third coefficients, respectively, in the Y'CbCr color space, and wherein increasing brightness of the currently presented image comprises:
adjusting a gamma value from a first value γ to a second value γ',
wherein the first value γ is used to encode the original image data in the Y'CbCr color space, and
wherein the second value γ' is used to decode the original image data in the Y'CbCr color space.

8. The method of claim 1, further comprising:
maintaining the increased brightness of the currently presented image for a predefined duration; and
decreasing the brightness to an original brightness upon expiration of the predefined duration.

9. The method of claim 1, wherein detecting the predefined user action comprises:
detecting a user action of a predefined controller of the remote control, wherein a predefined function of the predefined controller is to initiate the brightness increase of the currently presented image.

10. The method of claim 9, further comprising:
maintaining the increased brightness of the currently presented image for a predefined duration that is associated with a first detected actuation of the predefined controller; and
decreasing the brightness to an original brightness upon expiration of the predefined duration.

11. The method of claim 10, wherein the predefined duration is a first predefined duration, and further comprising:
detecting a second actuation of the predefined controller within a second predefined duration;
maintaining the increased brightness of the currently presented image for a third predefined duration in response to detecting the second actuation of the predefined controller, wherein the third predefined duration is twice the first predefined duration; and
decreasing the brightness to the original brightness upon expiration of the third predefined duration.

12. The method of claim 9, wherein the increased brightness is at a first increased brightness level, and further comprising:
detecting a second actuation of the predefined controller within a predefined duration; and
further increasing brightness of the currently presented image that is being presented on the display to a second increased brightness level in response to detecting the second actuation of the predefined controller, wherein the second increased brightness level is greater than the first increased brightness level.

13. The method of claim 1, wherein prior to increasing the brightness of the currently presented image, the method further comprising:
presenting a brightness adjustment setup graphical user interface (GUI) on the display, wherein the presented brightness adjustment setup GUI includes an active region configured to receive a user specification of a brightness adjustment level;
receiving the user specification of the brightness adjustment level;
storing the user specified brightness adjustment level; and
retrieving the stored user specified brightness adjustment level in response to detecting the predefined user action,
wherein the brightness of the currently presented image that is being presented on the display is increased in accordance with the user specified brightness adjustment level.

14. The method of claim 13, further comprising:
concurrently presenting a test image with presentation of the brightness adjustment setup GUI on the display,
wherein brightness of a concurrently presented test image is increased in accordance with the user specified brightness adjustment level.

15. The method of claim 1, wherein prior to increasing the brightness of the currently presented image, the method further comprising:
presenting a brightness adjustment setup graphical user interface (GUI) on the display, wherein the presented brightness adjustment setup GUI includes an active region configured to receive a user specification of a duration for which the increased brightness of the currently presented image is maintained;
receiving the user specification of the duration;
storing the duration; and
retrieving the stored user duration in response to detecting the predefined user action,
wherein the brightness of the currently presented image that is being presented on the display is maintained for the duration of the user specified duration, and
wherein the brightness is decreased to the original brightness upon expiration of the user specified duration.

16. The method of claim 1, further comprising:
determining a type of the display; and
comparing the determined type of display with a listing of display types, wherein each of the listed display types is associated with at least one characteristic that defines brightness of an image when the image is presented by that display type,
wherein brightness of the currently presented image is increased based on the at least one characteristic associated with the determined display type.

17. The method of claim 1, wherein each small region of the image is defined by the first, the second and the third coefficients, respectively, in the YCbCr color space, and wherein increasing brightness of the currently presented image comprises:
adjusting a value of the first coefficient Y from a first value to a second value,
wherein the first value of the first coefficient Y is received in original image data, and wherein the second value is greater than the first value by a predefined amount.

18. A media device, comprising:
a media content stream interface configured to receive a media content stream with a plurality of serially presented media content events therein, wherein the media content event includes at least digital image information that is communicated from the media device to at least one component of a media presentation system, wherein the at least one component of the media presentation system has a display, and wherein the digital image information is presented on the display to a user;
a remote interface configured to receive a wireless signal communicated from a remote control, wherein the remote control communicates the wireless signal in response to a user actuation of a controller that is disposed on a surface of the remote control;
a presentation device interface that communicatively couples the media device to the at least one component of the media presentation system; and
a processor system communicatively coupled to the media content stream interface, the remote interface, and the presentation device interface, wherein the processor system is configured to:
communicate the media content event from the presentation device interface to the at least one component of the media presentation system that is communicatively coupled to the media device, wherein the communicated media content event is streamed out from the presentation device interface of the media device to the display of the component of the media presentation system as a stream of content, wherein the streaming video portion of the media content event is communicated as digital data using one of a YCbCr color space or a Y'CbCr color space, where Y is a first coefficient that is a luma component of the YCbCr color space, where Cb is a second coefficient that is a blue-difference chroma component of the YCbCr color space, where Cr is a third coefficient that is a red-difference chroma component of the YCbCr color space, and where Y' is a fourth coefficient is a gamma corrected luma component of the Y'CbCr color space, and wherein the communicated digital data defined by the YCbCr color space or the Y'CbCr color space of the streaming video portion of the media content event is presented on the display to the user;
detect, during presentation of the media content event to the user, an actuation of the controller on the remote control based on the received wireless signal communicated from the remote control;
detect an ambient light level using a light detector;
compare the detected ambient light level with a predefined threshold lighting level to determine a difference between the detected ambient light and the predefined threshold lighting level;
increase, at the media device, a value of one of the first coefficient corresponding to Y of the YCbCr color space or the fourth coefficient corresponding to Y' of the YCbCr color space from an original value to an increased value, wherein the increased value increases brightness of a currently presented image that is being presented on the display in response to detecting the actuation of the controller, wherein an ambient lighting level in the vicinity of the display is increased by the determined difference between the detected ambient light and the predefined threshold lighting level, and wherein an ambient lighting level in the vicinity of the display is increased to at least the predefined threshold lighting level such that the user of the remote control is able to more clearly discern the controller disposed on the surface of the remote control and more clearly discern a denoted controller frnction associated with the controller;
continue to communicate the media content event from the presentation device interface of the media device to the display of the component of the media presentation system, wherein the communicated media content event is streamed out from the presentation device interface of the media device using the increased value of the first coefficient corresponding to Y of the YCbCr color space or the fourth coefficient corresponding to Y' of the YCbCr color space;
maintain the increased value of the first coefficient corresponding to Y of the YCbCr color space or the fourth coefficient corresponding to Y' of the YCbCr color space so that the brightness of the currently presented image for a predefined duration continues; and
decrease the increased value of the of first coefficient corresponding to Y of the YCbCr color space or the fourth coefficient corresponding to Y' of the YCbCr color space to the original value upon expiration of the predefined duration.

19. The media device of claim 18, wherein the processor system is further configured to:
reduce a contrast of the currently presented image concurrently with increasing the brightness of the currently presented image.

20. The media device of claim 18, further comprising:
a light detector communicatively coupled to the processor system and configured to detect a level of ambient light,
wherein the processor system is further configured to:
determine the ambient light level based on the detected level of ambient light detected at the light detector; and
compare the detected ambient light level with a light level threshold,
wherein brightness of the currently presented image is increased only when the detected ambient light level is less than the light level threshold.

21. A system, comprising:
a remote control that communicates one of an infrared (IR) signal or a radio frequency (RF) signal in response to a user actuating one of a plurality of controllers disposed on the surface of the remote control;
a light detector that detects ambient light; and
a media device communicatively coupled to a display, the remote control and the light detector, such that when the system is being operated by a user:
the media device receives a media content event that includes a streaming video portion that is communicated to and presented on a display, wherein the streaming video portion of the media content event is communicated as digital data using one of a YCbCr color space or a Y'CbCr color space, where Y is a first coefficient that is a luma component of the YCbCr color space, where Cb is a second coefficient that is a blue-difference chroma component of the YCbCr color space, where Cr is a third coefficient that is a red-difference chroma component of the YCbCr color space, and where Y' is a fourth coefficient is a gamma corrected luma component of the Y'CbCr color space;

the media device, from time to time, receives one of the IR signal and the RF signal communicated by the remote control;

the media device receives information from the light detector corresponding to a detected ambient light level;

the media device compares the detected ambient light level with a predefined threshold lighting level to determine a difference between the detected ambient light level and the predefined threshold lighting level;

the media device increases a value of one of the first coefficient corresponding to Y of the YCbCr color space or the fourth coefficient corresponding to Y' of the YCbCr color space from an original value to an increased value, wherein the increased value increases brightness of a currently presented image that is being presented on the display such that the ambient lighting level in the vicinity of the display is increased by the determined difference between the detected ambient light level and the predefined threshold lighting level, and so that the ambient lighting level in the vicinity of the user is increased to at least the predefined threshold lighting level such that the user is able to more clearly discern the plurality of controllers on the surface of the remote control and more clearly discern a denoted controller function associated with each of the plurality of controllers on the surface of the remote control.

22. The system of claim 21, wherein the light detector is disposed on one of the surface of the remote control and a surface of the media device.

* * * * *

UNITED STATES PATENT AND TRADEMARK OFFICE
CERTIFICATE OF CORRECTION

PATENT NO.         : 9,961,408 B2
APPLICATION NO.    : 14/573929
DATED              : May 1, 2018
INVENTOR(S)        : Jeremy Mickelsen et al.

It is certified that error appears in the above-identified patent and that said Letters Patent is hereby corrected as shown below:

In the Claims

Claim 18, Column 22, Line 8:
frnction should be changed to -- function --

Signed and Sealed this
Second Day of July, 2019

Andrei Iancu
*Director of the United States Patent and Trademark Office*